(12) United States Patent
Tsai et al.

(10) Patent No.: US 12,523,920 B2
(45) Date of Patent: Jan. 13, 2026

(54) ACCESS CONTROL DEVICE WITH PHOTOGRAPHING ANGLE ADJUSTMENT FUNCTION

(71) Applicant: Primax Electronics Ltd., Taipei (TW)

(72) Inventors: Yung-Ming Tsai, Taipei (TW);
Hsing-Fang Yeh, Taipei (TW);
Chuan-Rung Sung, Taipei (TW);
Ching-Lun Hsiao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 383 days.

(21) Appl. No.: 18/204,389

(22) Filed: May 31, 2023

(65) Prior Publication Data
US 2024/0345453 A1      Oct. 17, 2024

(30) Foreign Application Priority Data

Apr. 14, 2023   (TW) .................................. 112114027

(51) Int. Cl.
*G03B 5/04*   (2021.01)
*G03B 5/02*   (2021.01)
*G06F 21/32*  (2013.01)

(52) U.S. Cl.
CPC ................. *G03B 5/04* (2013.01); *G03B 5/02* (2013.01); *G06F 21/32* (2013.01); *G03B 2205/0053* (2013.01)

(58) Field of Classification Search
CPC .. G03B 5/04; G03B 17/02; G03B 2205/0053; G06F 21/32
See application file for complete search history.

(56) References Cited

FOREIGN PATENT DOCUMENTS

| CN | 202049540 U | * | 11/2011 |
| CN | 212900817 U | * | 4/2021 |

* cited by examiner

*Primary Examiner* — Minh Q Phan
(74) *Attorney, Agent, or Firm* — KIRTON McCONKIE; Evan R. Witt

(57) ABSTRACT

An access control device includes a main body, a rotating mechanism, a camera module, a first driving motor and a second driving motor. The rotating mechanism includes a first rotating shaft and a second rotating shaft. The rotating mechanism is pivotally coupled to the main body through the second rotating shaft. The camera module is fixed on the first rotating shaft. The first driving motor is drivingly coupled to the first rotating shaft. The first driving motor drives rotation of the first rotating shaft. Consequently, a photographing angle of the camera module is adjusted in a first angular range. The second driving motor is drivingly coupled to the second rotating shaft. The second driving motor drives rotation of the second rotating shaft. Consequently, the photographing angle of the camera module is adjusted in a second angular range.

16 Claims, 9 Drawing Sheets

ACCESS CONTROL DEVICE WITH PHOTOGRAPHING ANGLE ADJUSTMENT FUNCTION

FIELD OF THE INVENTION

The present invention relates to an access control device with a photographing angle adjustment function, and more particularly to an access control device with a camera module, in which the photographing angle of the camera module can be adjusted through the up/down or leftward/rightward angle adjustment.

BACKGROUND OF THE INVENTION

Generally, companies, factories, storefronts or residences usually set door locks or access control devices for their access doors. The uses of the door locks or the access control devices can achieve security purposes such as anti-theft and access control. Conventionally, the door locks or the access control devices use traditional keys, proximity cards, password input technologies or fingerprint recognition technologies to control access. With the development of image sensing technologies and facial recognition technologies, a security system or an access control device using the user's face image as the basis for identification has begun to be widely used in the market.

As known, the access control device using the facial recognition technology is designed according to the concepts similar to the "facial recognition unlocking" design of a smart phone. That is, after the face of a person standing in front of the door is photographed by a built-in camera of the access control device, the captured image is compared with the image data of the safety list stored in the built-in database. If the identity of the person is authenticated according to the comparison result, the access control device will be unlocked to allow the person to open the door.

However, since the general door lock or access control device is installed on a fixed position on the door panel, the built-in camera of the access control device with the facial recognition function is kept at the same height. In other words, the image sensing angle and the image sensing range of the camera are fixed.

Since the heights of the users for undergoing the facial recognition are possibly different, the use of the conventional access control device has some drawbacks. For example, there may be adults and children in the same family. Since the heights of adults and children are generally different, the photographic efficacy of the access control device with the facial recognition function is limited. Otherwise, the user has to bend over, squat down or step up to match the photographing angle of the camera, which will cause inconvenience to the user. Furthermore, in case that the user is sitting in a wheelchair, the height of the user face may be lower. However, the user cannot be raised to match the photographing angle of the camera.

Moreover, for achieving the satisfactory facial recognition efficacy, it is necessary to take a relatively stereoscopic image of the person's face. In order to increase the success rate of correct recognition, the persons who want to pass the door needs to move left and right, move sideways, nod heads, shake heads or make some other motions in front of the access control device. However, the facial-recognition access control device is not user-friendly to the users who are not familiar with the complicated operating process.

SUMMARY OF THE INVENTION

An object of the present invention provides an access control device with a photographing angle adjustment function. The photographing angle of a camera module of the access control device can be adjusted through the up/down or leftward/rightward angle adjustment. Consequently, the access control device is more friendly to the users that are ready to undergo the facial recognition, and the success rate of correct recognition is enhanced.

In accordance with an aspect of the present invention, an access control device with a photographing angle adjustment function is provided. The access control device includes a main body, a rotating mechanism, a camera module, a first driving motor and a second driving motor. The main body includes a rotating seat. The rotating mechanism is installed on the rotating seat. The rotating mechanism includes a first rotating shaft and a second rotating shaft. The rotating mechanism is pivotally coupled to the main body through the second rotating shaft. The camera module is disposed within the rotating mechanism and fixed on the first rotating shaft. The camera module has a photographing function. The first driving motor is disposed within the main body and drivingly coupled to the first rotating shaft. The first driving motor drives rotation of the first rotating shaft. Consequently, a photographing angle of the camera module is adjusted in a first angular range. The second driving motor is disposed within the main body and drivingly coupled to the second rotating shaft. The second driving motor drives rotation of the second rotating shaft. Consequently, the photographing angle of the camera module is adjusted in a second angular range.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides an access control device with a photographing angle adjustment function. An embodiment of the access control device will be described as follows.

Figure 1A:
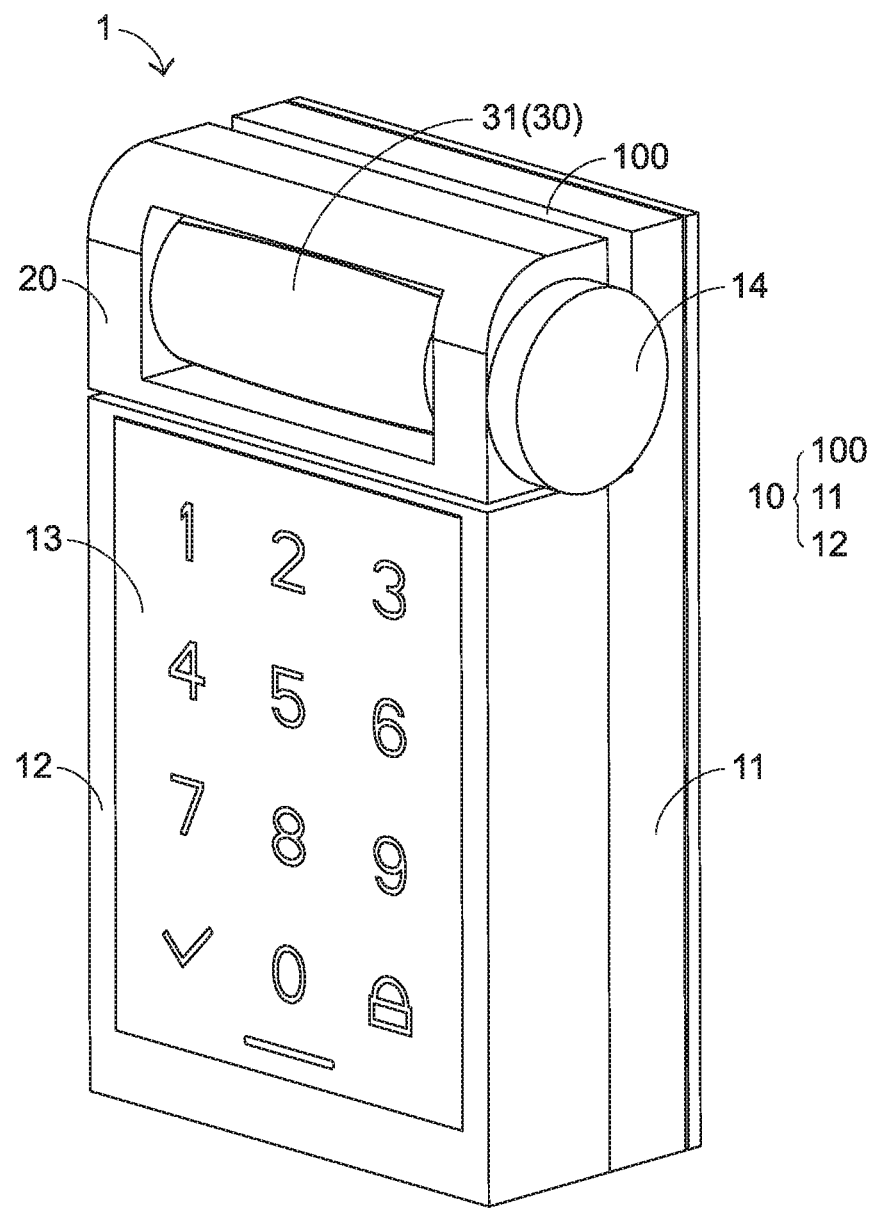
FIG. 1A is a schematic perspective view illustrating an access control device according to an embodiment of the present invention.
Figure 1B:
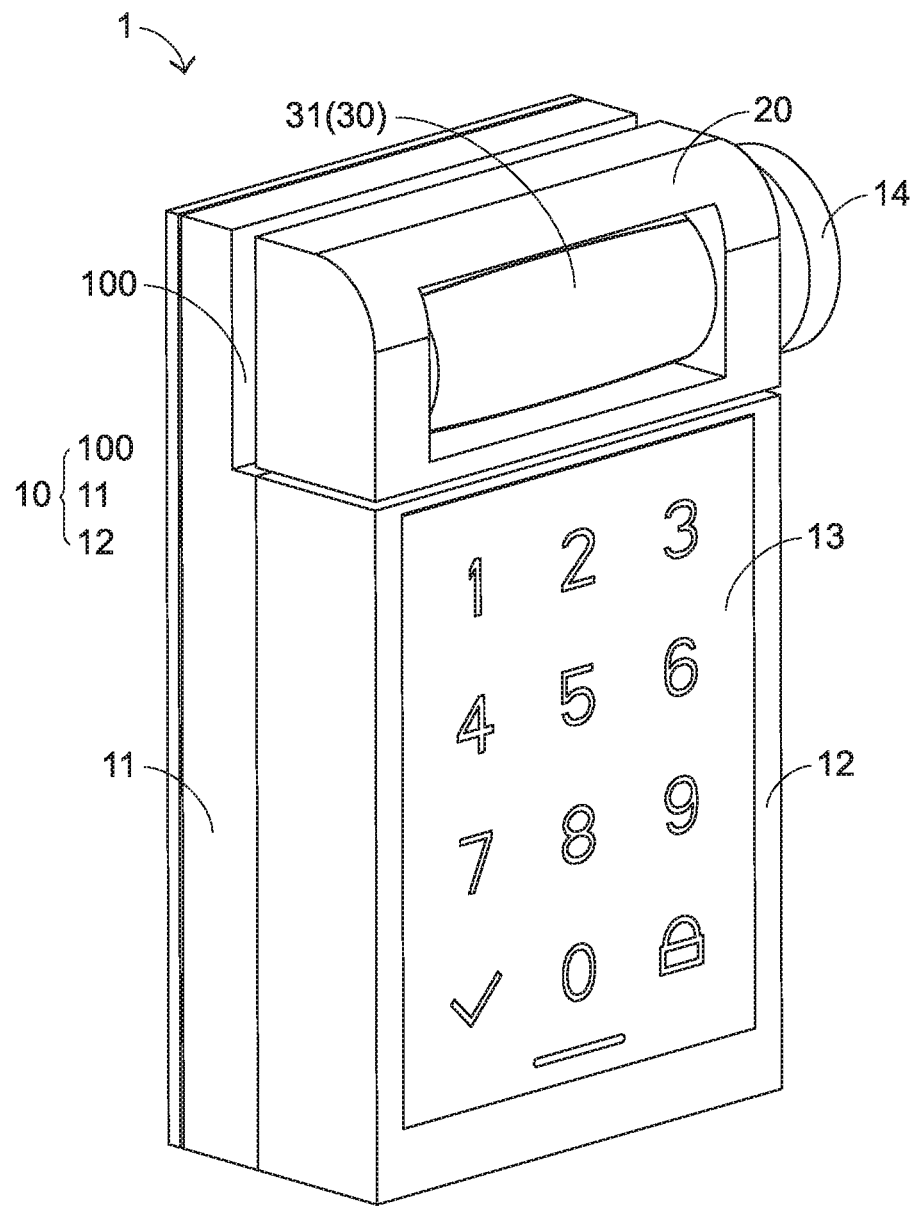
FIG. 1B is a schematic perspective view illustrating the access control device as shown in FIG. 1A and taken along another viewpoint.

Please refer to FIGS. 1A and 1B. FIG. 1A is a schematic perspective view illustrating an access control device according to an embodiment of the present invention. FIG. 1B is a schematic perspective view illustrating the access control device as shown in FIG. 1A and taken along another viewpoint.

As shown in FIGS. 1A and 1B, the access control device 1 mainly comprises a main body 10 and a rotating mechanism 20. The main body 10 comprises a rotating seat 100. The rotating mechanism 20 is installed on the rotating seat 100.

In an embodiment, the main body 10 comprises a base plate 11 and a housing 12. The housing 12 is installed on the base plate 11. The rotating seat 100 is an accommodation space that is defined by an outer portion of the housing 12 and a front surface of the base plate 11 collaboratively. The rotating mechanism 20 is disposed within the accommodation space. In addition, the rotating mechanism 20 is disposed within the accommodation space in a pivotally rotatable manner.

In this embodiment, the access control device 1 is applied to and installed on a door panel (not shown). The structure of the door panel is known to those skilled in the art, and not redundantly described herein. It can be understood that the access control device 1 has the identity recognition function, especially the facial recognition function. Furthermore, the access control device 1 is electrically connected with other associated units, for example including an electromagnetic lock and a power supply (not shown). The electromagnetic lock is controlled according to the detection result of the access control device 1. The access control device 1 is powered by the power supply. The associated units are well known to those skilled in the art, and not redundantly described herein. It is noted that numerous modifications and alterations may be made while retaining the teachings of the invention. For example, in another embodiment, the access control device of the present invention is applied to and installed on a wall next to a control gate. After the identity of the user is authenticated, the access control device issues a control signal to the control gate in a wireless transmission manner. According to the control signal, the door panel is opened or not opened.

Please refer to FIGS. 1A and 1B again. In an embodiment, the access control device 1 further comprises a camera module 30, an operation interface 13 and a knob element 14. The camera module 30 is disposed within the rotating mechanism 20 for photographing objects. In FIGS. 1A and 1B, only a protecting cover 31 of the camera module 30 is shown. The operation interface 13 is installed on the main body 10. Particularly, the operation interface 13 is installed on the housing 12 of the main body 10. The knob element 14 is located beside a side of the rotating mechanism 20. The knob element 14 can be operated and manually rotated by the user.

The operation interface 13 is provided for the user to perform a password input operation, enable a facial recognition function or perform any other appropriate operation. Furthermore, the access control device 1 with the photographing angle adjustment function of the present invention may be operated in an automatic mode or a manual mode. When the photographing angle adjustment function is enabled, the photographing angle of the camera module 30 is automatically adjusted. Consequently, the camera module 30 can photograph objects at the proper photographing angle. In accordance with a feature of the present invention, the user can manually rotate the knob element 14 to adjust the photographing angle of the camera module 30. In other words, the photographing angle of the camera module 30 can be automatically or manually adjusted according to the practical usage conditions. The detailed structural design and the operating principle of the access control device 1 will be described later.

Figure 2A:
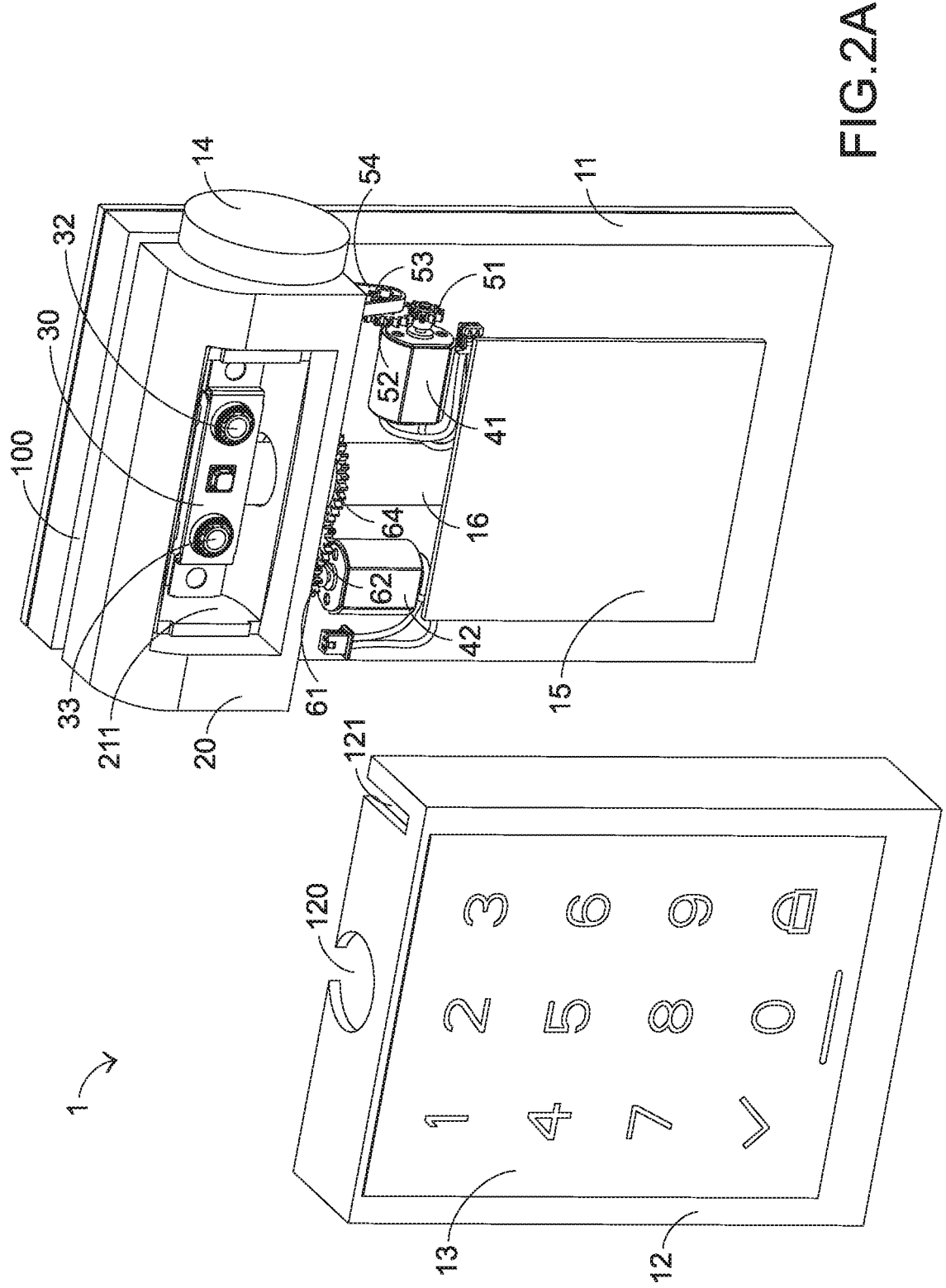
FIG. 2A is a schematic exploded view illustrating a portion of the access control device according to the embodiment of the present invention.
Figure 2B:
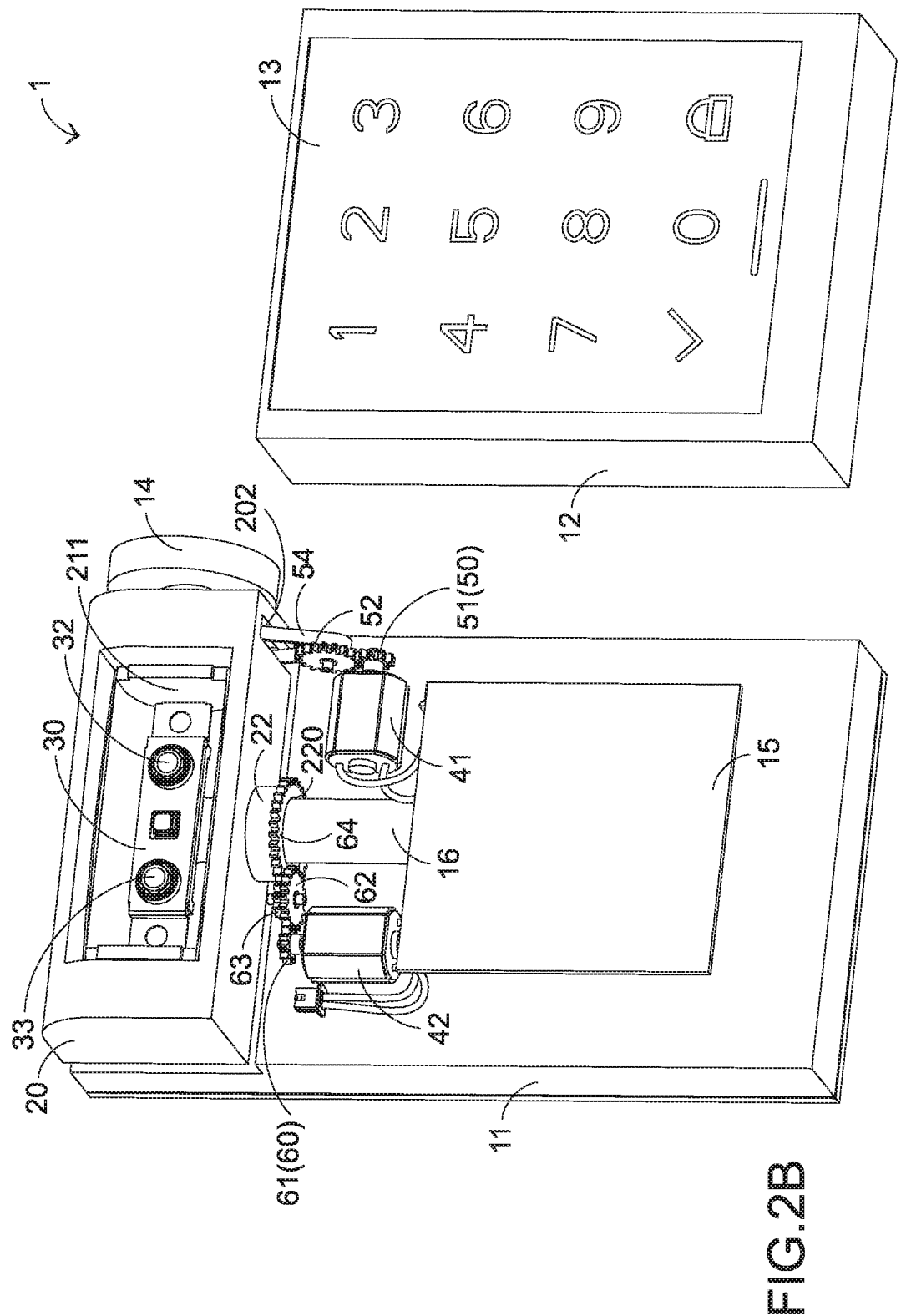
FIG. 2B is a schematic exploded view illustrating the access control device as shown in FIG. 2A and taken along another viewpoint.
Figure 2C:
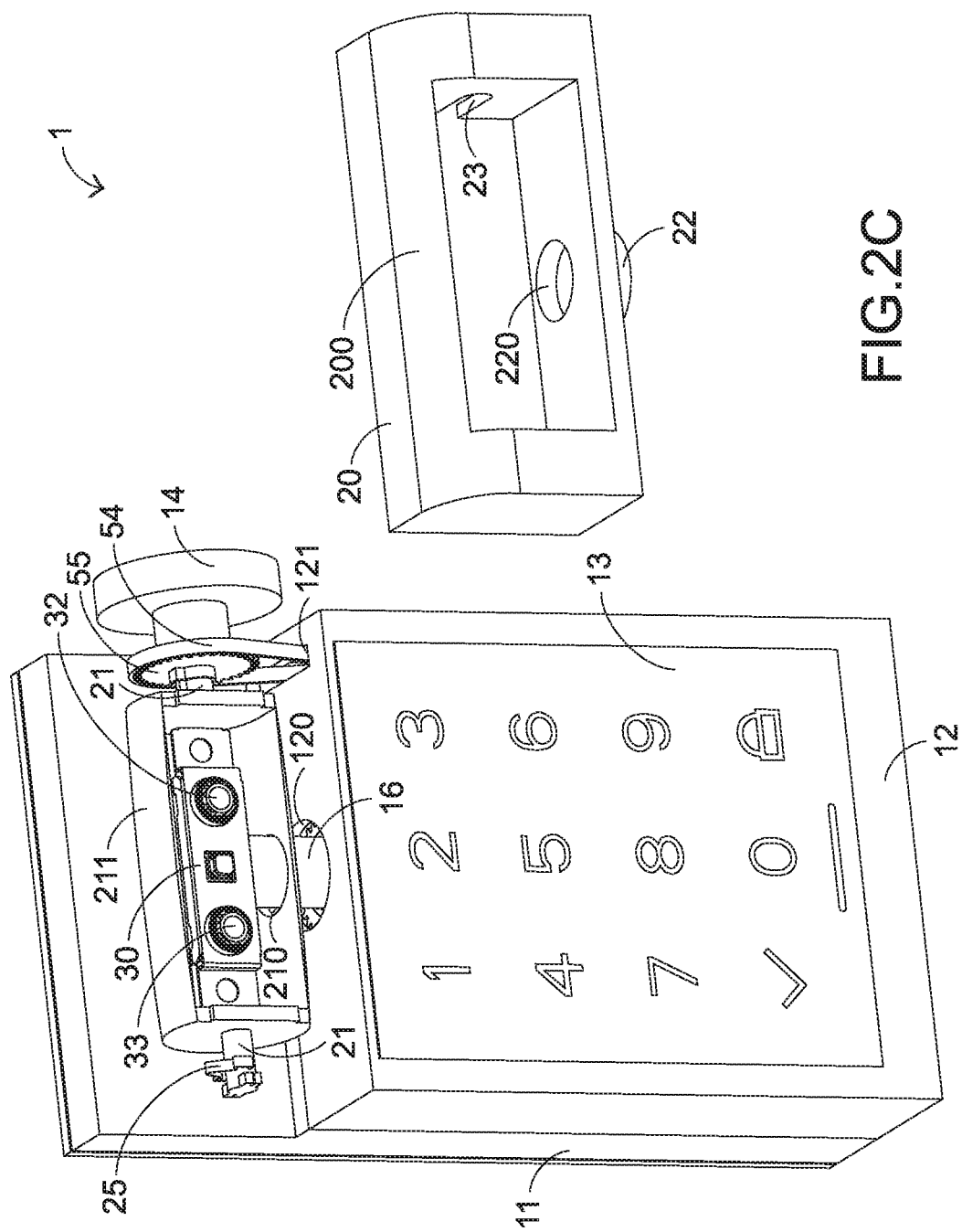
FIG. 2C is a schematic exploded view illustrating another portion of the access control device according to the embodiment of the present invention.
Figure 2D:
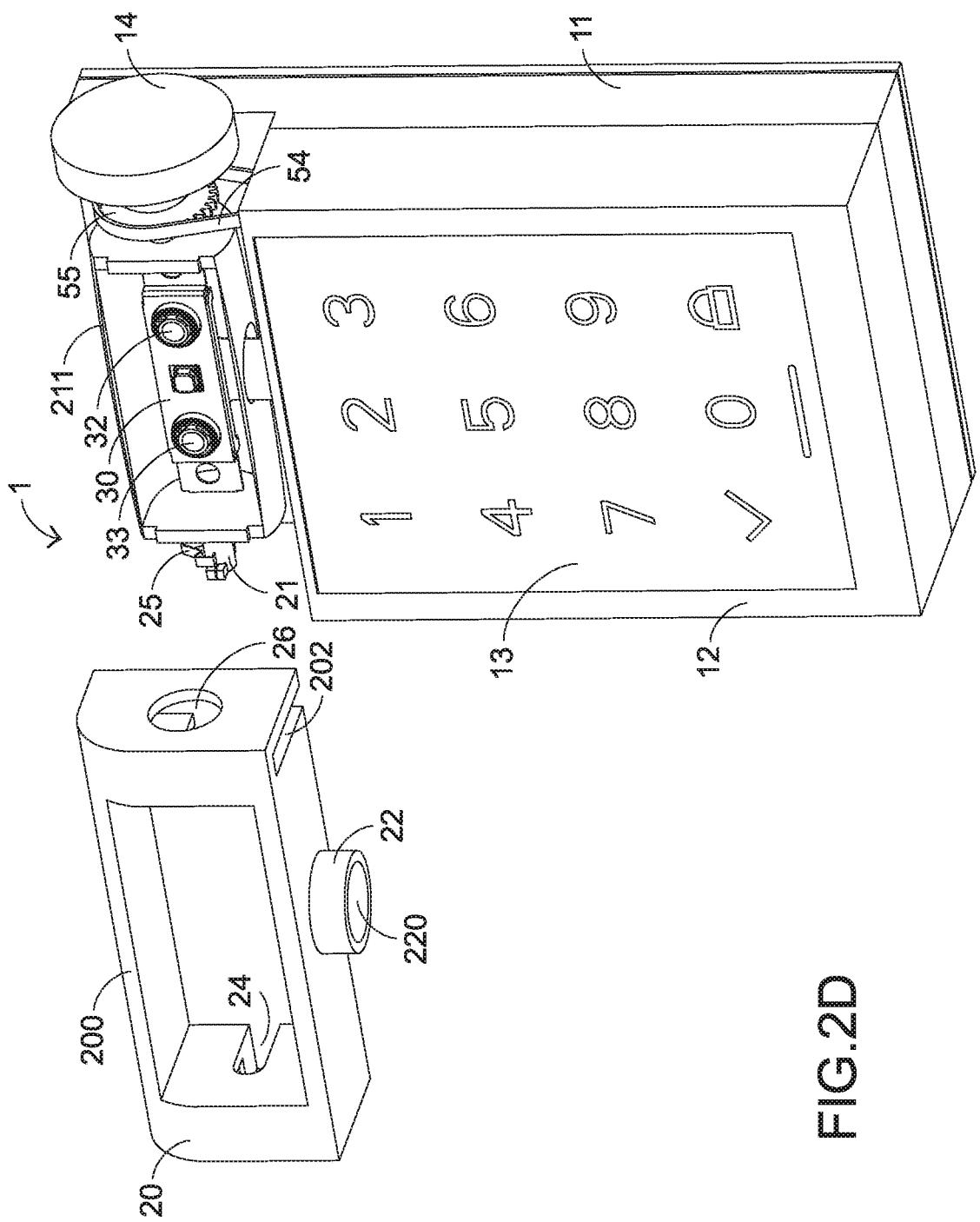
FIG. 2D is a schematic exploded view illustrating the access control device as shown in FIG. 2C and taken along another viewpoint.

Please refer to FIGS. 2A, 2B, 2C and 2D. FIG. 2A is a schematic exploded view illustrating a portion of the access control device according to the embodiment of the present invention. FIG. 2B is a schematic exploded view illustrating the access control device as shown in FIG. 2A and taken along another viewpoint. FIG. 2C is a schematic exploded view illustrating another portion of the access control device according to the embodiment of the present invention. FIG. 2D is a schematic exploded view illustrating the access control device as shown in FIG. 2C and taken along another viewpoint. For facilitating understanding the concepts of the present invention, the protecting cover 31 is not shown in FIGS. 2A, 2B, 2C and 2D. Consequently, two photographic lenses 32 and 33 of the camera module 30 are exposed. In this embodiment, the camera module comprises two photographic lenses. It is noted that the number of the photographic lenses is not restricted. For example, in another embodiment, the camera module comprises a single photographic lens. In addition, the photographic lens is a wide-angle lens. It is noted that the type of the photographic lens is not restricted. The type of the photographic lens may be determined according to its recognition efficacy or application requirement.

Please refer to FIGS. 2A, 2B, 2C and 2D again. In an embodiment, the access control device 1 further comprises a first driving motor 41, a second driving motor 42, a first transmission assembly 50, a second transmission assembly 60, a control module 15 and a wiring unit 16. The first driving motor 41, the second driving motor 42, the second transmission assembly 60 and the control module 15 are disposed within the main body 10, especially disposed within the space between the base plate 11 and the housing 12.

The control module 15 is electrically connected with the operation interface 13, the first driving motor 41, the second driving motor 42 and the wiring unit 16. The control module 15 comprises a circuit board, a processor, a memory and any other appropriate electronic components. The control module 15 can receive instructions from the operation interface 13 and control the operations of the first driving motor 41 and the second driving motor 42. Moreover, through the wiring unit 16, the control module 15 controls the operations of the camera module 30 and receives the photographing result of the camera module 30. In other words, the control module 15 is the main control component for controlling the photographing angle adjustment function.

In an embodiment, the method of automatically implementing the photographing angle adjustment is executed by a firmware component that is installed in the control module 15. Alternatively, the photographing angle adjustment is written as an operation program code and stored in a flash memory of the control module 15. The firmware component or the operation program code is provided to execute an automatic facial recognition program. When the automatic facial recognition program is executed, the access control device 1 can track the better facial recognition efficacy while automatically controlling the first driving motor 41, the second driving motor 42 and the camera module 30.

In an embodiment, the rotating mechanism 20 comprises a frame structure 200, a first rotating shaft 21 and a second rotating shaft 22. The second rotating shaft 22 is formed on a bottom surface of the frame structure 200. The two ends of the first rotating shaft 21 are respectively received within two pivotal holes 23 and 24 at two sides of the frame structure 200. Consequently, the first rotating shaft 21 is rotatable within the frame structure 200.

Moreover, a pivotal hole 120 is formed in the housing 12 of the main body 10. The pivotal hole 120 is aligned with the second rotating shaft 22. Consequently, the second rotating shaft 22 is rotatably installed in the pivotal hole 120. In other words, the rotating mechanism 20 can be pivotally coupled to the housing 12 of the main body 10 through the second rotating shaft 22. The frame structure 200 further comprises a perforation 26 beside the pivotal hole 23. An end of the first rotating shaft 21 is penetrated through the perforation 26 and connected with the knob element 14.

In an embodiment, the camera module 30 is fixed on the first rotating shaft 21. In addition, the first rotating shaft 21 further comprises a protective case 211. The camera module 30 is disposed within the protective case 211 of the first rotating shaft 21. In addition, the front edge of the protective case 211 is assembled with the protecting cover 31, which is made of a light-transmissible material. A perforation 210 runs through a bottom surface of the protective case 211. The second rotating shaft 22 has a hollow portion. The hollow portion runs through the bottom surface of the frame structure 200 and formed as a perforation 220. The perforation 220 is aligned with the perforation 210 of the protective case 211. A first terminal of the wiring unit 16 is electrically connected to the control module 15. After the second terminal of the wiring unit 16 is penetrated through the hollow and tubular second rotating shaft 22 (i.e., penetrated through the perforation 220), the second terminal of the wiring unit 16 is electrically connected to the camera module 30.

In accordance with another feature of the present invention, the first rotating shaft 21 and the second rotating shaft 22 are perpendicular to each other. The first driving motor 41 is drivingly coupled to the first rotating shaft 21. The second driving motor 42 is drivingly coupled to the second rotating shaft 22. Consequently, the first rotating shaft 21 and the second rotating shaft 22 can be driven to rotate. Due to this structural design, the photographing angle of the camera module 30 can be adjusted in two different angular ranges.

Please refer to FIGS. 2A, 2B, 2C and 2D again. The first driving motor 41 and the first transmission assembly 50 cooperate with each other to drive the first rotating shaft 21. In an embodiment, the first transmission assembly 50 comprises four gear units 51, 52, 53 and 55 and a belt 54. In addition, a first opening 121 is formed in a top surface of the housing 12 of the main body 10, and a second opening 202 is formed in the bottom surface of the frame structure 200 of the rotating mechanism 20. The first opening 121 and the second opening 202 are aligned with each other.

The gear unit 51 is installed on the first driving motor 41. The gear unit 52 is engaged with the gear unit 51. The gear unit 53 is coaxially installed on the gear unit 52. The gear unit 55 is coaxially installed on the first rotating shaft 21. The belt 54 is sheathed around the gear unit 53. In addition, after the belt 54 is penetrated through the first opening 121 and the second opening 202, the belt 54 is sheathed around the gear unit 55 on the first rotating shaft 21.

In an embodiment, the ratio of the tooth number of the gear units is specially designed. Consequently, the rotating speed of the first rotating shaft 21 is properly adjusted according to the original rotating speed of the first driving motor 41. Moreover, a driving time is set by the control module 15. According to the driving time, the belt 54 is driven and rolled by the first driving motor 41. Consequently, the first rotating shaft 21 is correspondingly rotated at a required rotating angle, and the camera module 30 is rotated to the designated orientation. In order to achieve the better adjustment efficacy, the belt 54 used in the access control device 1 of the present invention is made of elastic or deformable material.

Similarly, the second driving motor 42 and the second transmission assembly 60 cooperate with each other to drive the second rotating shaft 22. The second transmission assembly 60 comprises three gear units 61, 62 and 63 and a gear structure 64. The gear unit 61 is installed on the second driving motor 42. The gear unit 62 is engaged with the gear unit 61. The gear unit 63 is coaxially installed on the gear unit 62. The gear structure 64 is coaxially installed on the second rotating shaft 22. In addition, the gear structure 64 is engaged with the gear unit 63.

In an embodiment, the ratio of the tooth number of the gear units or the gear structure is specially designed. Consequently, the rotating speed of the second rotating shaft 22 is properly adjusted according to the original rotating speed of the second driving motor 42. Moreover, a driving time is set by the control module 15. According to the driving time, the gear structure 64 is driven and rotated by the second driving motor 42. Consequently, the second rotating shaft 22 is correspondingly rotated at a required rotating angle, and the camera module 30 is rotated to the designated orientation. In order to achieve the better adjustment efficacy, the wiring unit 16 is a flexible printed circuit (FPC).

It is noted that the numbers and the installations of the gear units (or the gear structure) in the first transmission assembly 50 and the second transmission assembly 60 may be varied according to the practical requirements. For example, in case that the rotating speeds or the placement positions of the two driving motors 41 and 42 are different or size of the space between the base plate 11 and the housing 12 is changed, the installations of the first transmission assembly 50 and the second transmission assembly 60 are different. However, each of the first transmission assembly 50 and the second transmission assembly 60 is equipped with at least one gear unit. In another embodiment, the gear structure 64 is formed on a periphery of the second rotating shaft 22. That is, the gear structure 64 and the second rotating shaft 22 are integrally formed as a one-piece structure.

Please refer to FIGS. 2C and 2D. In an embodiment, the knob element 14 is coaxially installed on the first rotating shaft 21 of the rotating mechanism 20. Consequently, the user can operate the knob element 14 to manually rotate the first rotating shaft 21. In other words, the first rotating shaft 21 is the common rotating shaft for the knob element 14, the camera module 30 and the gear unit 55. Consequently, in addition to the action of rolling the belt 54 to rotate the first rotating shaft 21, the action of manually rotating the knob element 14 can rotate and adjust the photographing angle of the camera module 30.

Figure 2E:
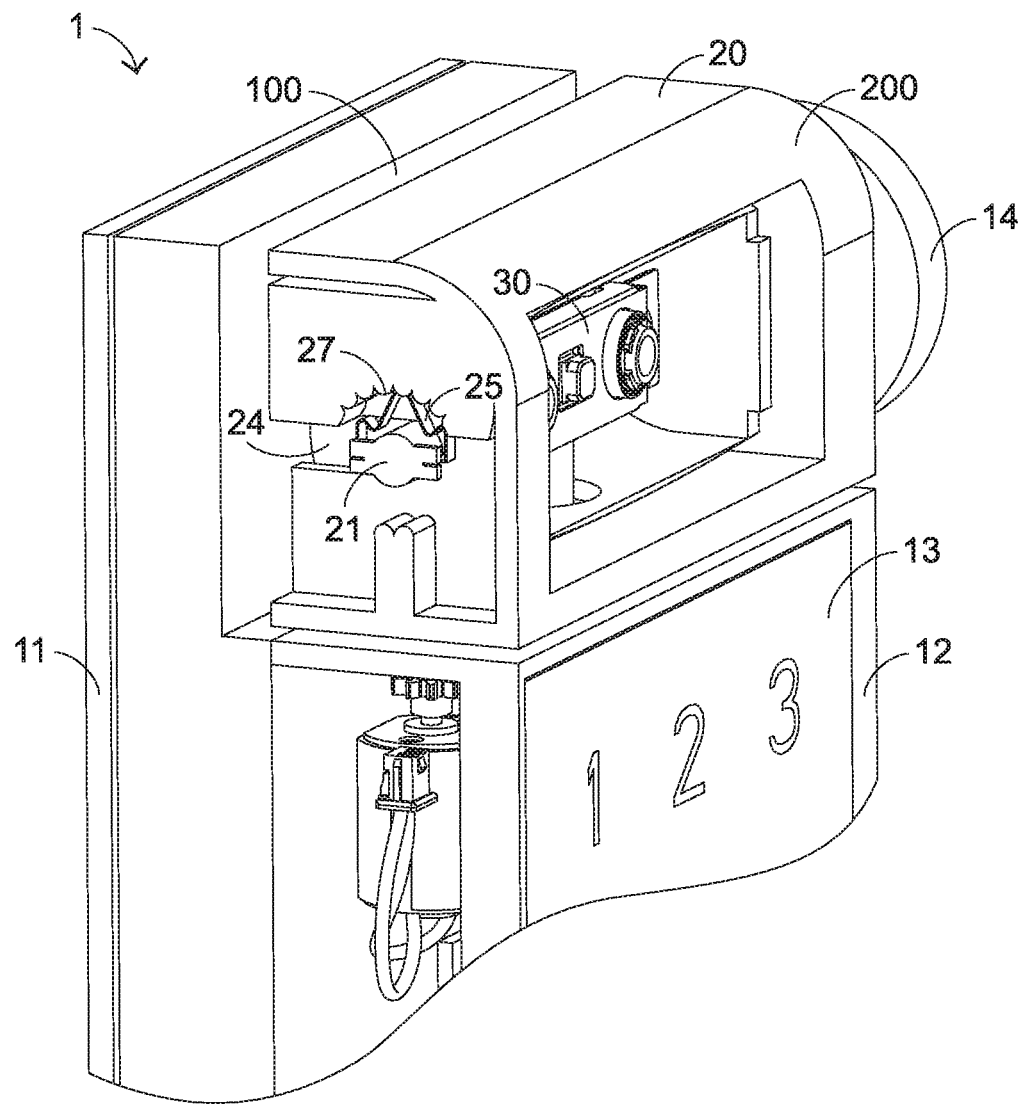
FIG. 2E is a schematic perspective and cutaway view illustrating a lateral structure of the access control device according to the embodiment of the present invention.

FIG. 2E is a schematic perspective and cutaway view illustrating a lateral structure of the access control device according to the embodiment of the present invention.

Please refer to FIGS. 2C, 2D and 2E. In order to enhance the tactile feel during the manual operation, the access control device 1 further comprises a stepped elastic piece 25. The stepped elastic piece 25 is installed on the end of the first rotating shaft 21 away from the knob element 14. The frame structure 200 of the rotating mechanism 20 further comprises a stepped structure 27 over the pivotal hole 24. As the first rotating shaft 21 is rotated, the stepped elastic piece 25 and the stepped structure 27 are engaged with each other in multiple stages. Consequently, the manual operation of the first rotating shaft 21 provides the stepped feel to the user.

Please refer to FIG. 2E again. The stepped elastic piece 25 comprises a smooth protrusion edge, and the stepped structure 27 comprises plural smooth and consecutive protrusion edges. The protrusion edge of the stepped elastic piece 25 can be engaged with the space between every two adjacent protrusion edges of the stepped structure 27. While the first rotating shaft 21 is rotated, the protrusion edge of the stepped elastic piece 25 is pressed down and moved to the space between the neighboring protrusion edges of the stepped structure 27. Consequently, the sensation of elasticity is transmitted, and the adjustment of one graduation is completed. When the protrusion edge of the stepped elastic piece 25 is rotated to the center position, the photographing angle of the camera module 30 is suitable for the average adults. When the protrusion edge of the stepped elastic piece 25 is rotated forward several graduations, the photographing angle of the camera module 30 is suitable for children or shorter persons. When the protrusion edge of the stepped elastic piece 25 is rotated backward several graduations, the photographing angle of the camera module 30 is suitable for taller persons.

Figure 3A:
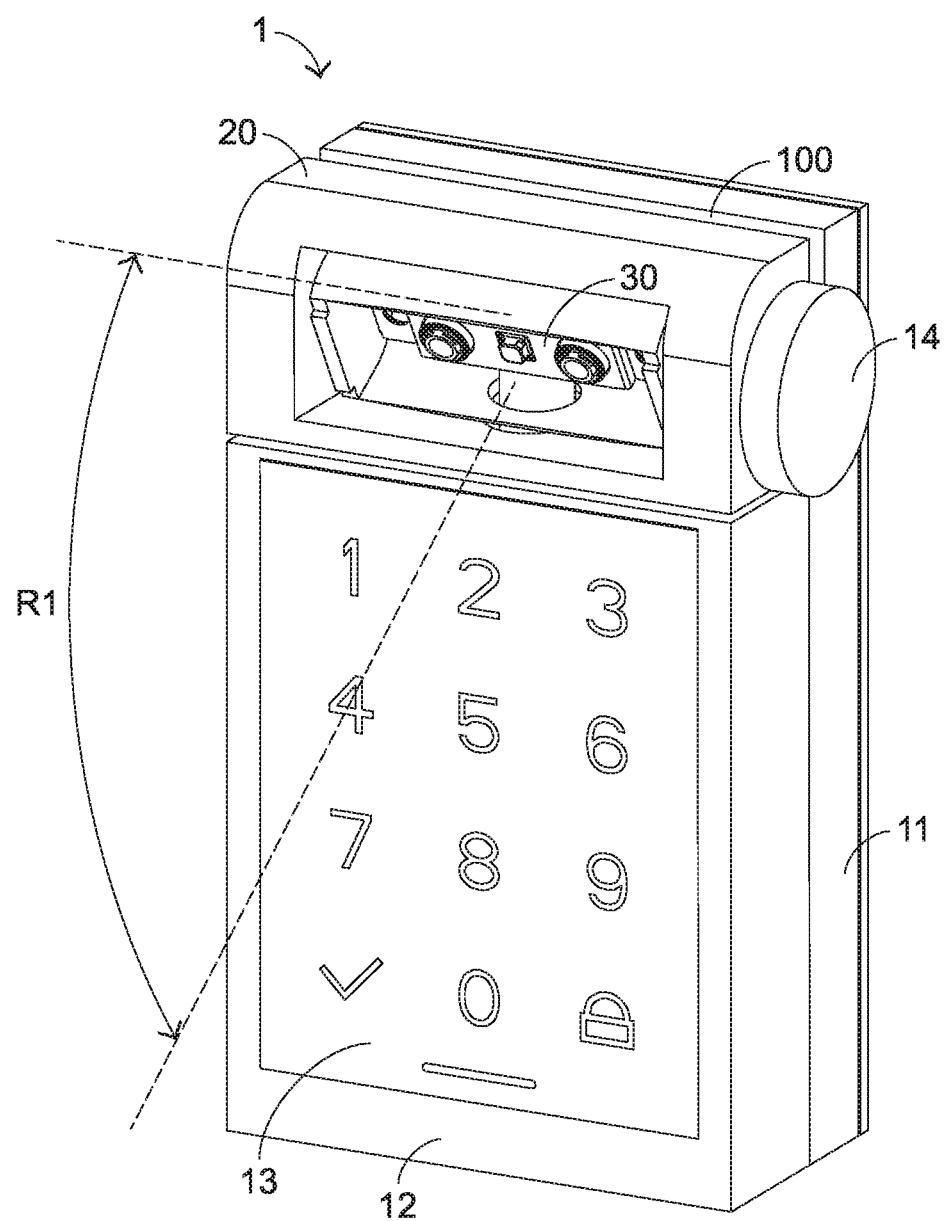
FIG. 3A schematically illustrates the up/down adjustment of the photographing angle of the camera module in the access control device according to the embodiment of the present invention.
Figure 3B:
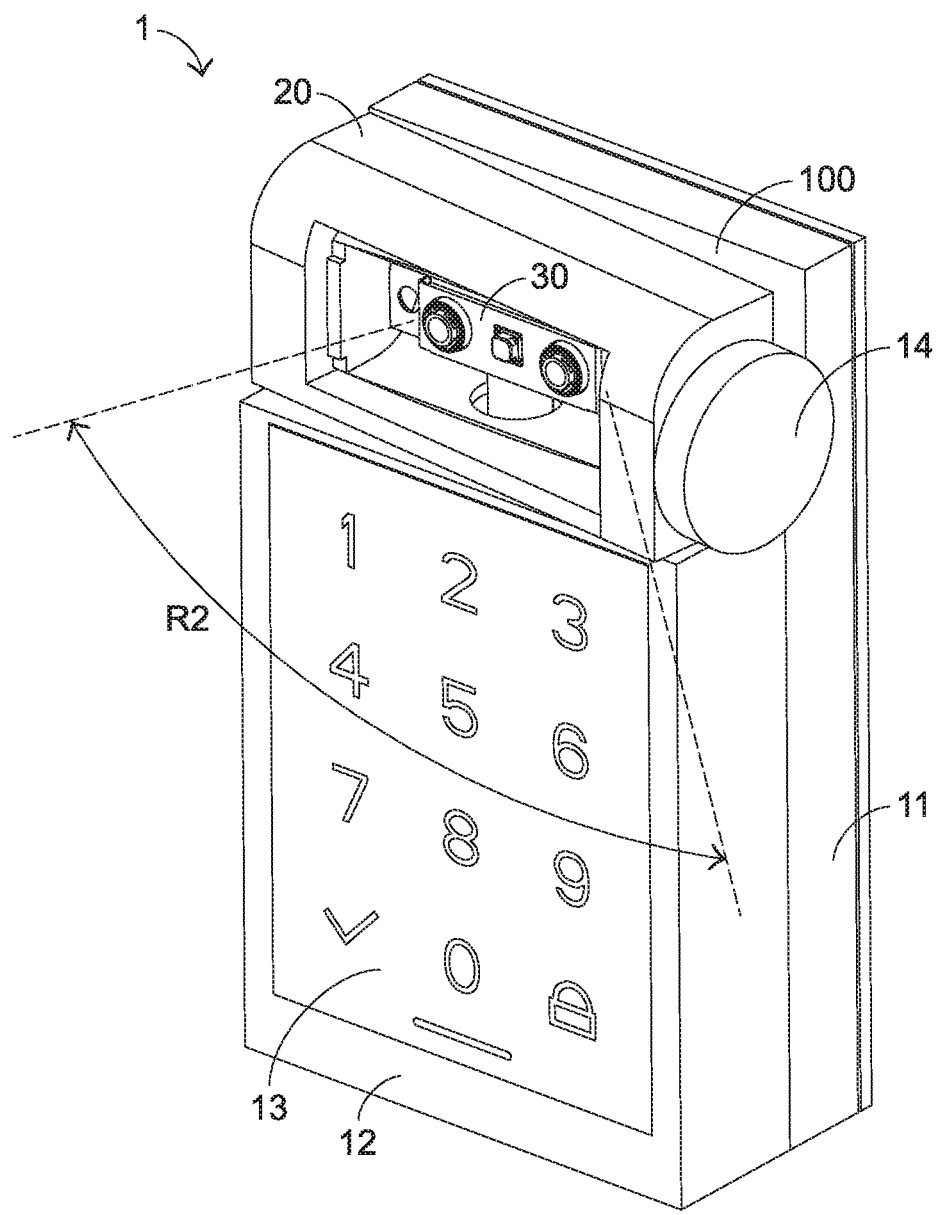
FIG. 3B schematically illustrates the leftward/rightward adjustment of the photographing angle of the camera module in the access control device according to the embodiment of the present invention.

Please refer to FIGS. 3A and 3B. FIG. 3A schematically illustrates the up/down adjustment of the photographing angle of the camera module in the access control device according to the embodiment of the present invention. FIG. 3B schematically illustrates the leftward/rightward adjustment of the photographing angle of the camera module in the access control device according to the embodiment of the present invention.

As mentioned above, the first rotating shaft 21 and the second rotating shaft 22 are perpendicular to each other. The camera module 30 can be rotated by using the first rotating shaft 21 as the axis. The rotating mechanism 20 can be rotated by using the second rotating shaft 22 as the axis. Consequently, as shown in FIGS. 3A and 3B, the photographing angle of the camera module 30 can be adjusted in a first angular range R1 and a second angular range R2, respectively.

A usage scenario of the access control device 1 will be described as follows. When the access control device 1 is installed on a door panel (not shown) or a wall (not shown), the first rotating shaft 21 is arranged in the horizontal direction, and the second rotating shaft 22 is arranged in the vertical direction. In case that the camera module 30 is adjusted at an angle of elevation above the horizontal line or the camera module 30 is adjusted at an angle of depression below the horizontal line, this up/down adjustment means that the photographing angle of the camera module 30 is adjusted in the first angular range R1. In case that the camera module 30 is adjusted at an angle deviated from the mid-perpendicular line through the rotation of the rotating mechanism 20, the leftward/rightward adjustment means that the photographing angle of the camera module 30 is adjusted in the second angular range R2.

In the situation of FIG. 3A, the photographing angle of the camera module 30 is adjusted down. Of course, the photographing angle of the camera module 30 may be adjusted up. Similarly, in the situation of FIG. 3B, the photographing angle of the camera module 30 is adjusted rightward. Of course, the photographing angle of the camera module 30 can be adjusted leftward. Especially, the rotating mechanism 20 and the camera module 30 can be rotated simultaneously. That is, while the up/down adjustment of the camera module 30 is performed, the camera module 30 can be adjusted leftward or rightward through the rotation of the rotating mechanism 20. Consequently, the field of view of the camera module 30 is expanded.

However, when the camera module 30 is rotated within the frame structure 200 to perform the up/down adjustment, the wiring unit 16 electrically connected with the camera module 30 will be pulled. As mentioned above, the wiring unit 16 is a flexible printed circuit (FPC). In case that the flexible printed circuit has a certain length, the wiring unit 16 is correspondingly bent or straightened during the rotation of the camera module 30 within the frame structure 200. Consequently, the rotation of the camera module 30 within the frame structure 200 can be performed smoothly. In other words, the scope of the first angular range R1 is related to the length of the wiring unit 16.

Furthermore, when the rotating mechanism 20 is installed on the rotating seat 100 to perform the leftward/rightward rotation, the belt 54 penetrated through the rotating mechanism 20 will be pulled. However, the photographing angle of the access control device using the facial recognition technology does not need to be adjusted to a large extent in the leftward/rightward direction. In addition, the belt 54 is made of elastic or deformable material. If the space of the designed rotating seat 100 is sufficient and the first opening 121 still has a sufficient gap to be aligned with the second opening 202, the stretching action and the rolling action of the belt 54 will not be hindered. Consequently, the rotation of the rotating mechanism 20 on the rotating seat 100 can be performed smoothly. In other words, the scope of the second angular range R2 is related to the distance between the base plate 11 and the rotating mechanism 20, or the scope of the second angular range R2 is related to the distance between the door panel (where the access control device is installed) and the rotating mechanism 20.

From the above description, the present invention provides the access control device with the photographing angle adjustment function. The access control device can effectively expand the field of view of the photographic lenses. Regardless of whether the person who wants to undergo the facial recognition is tall or short, or whether the standing position deviates from the photographic lenses, the camera module of the access control device can be driven to rotate in the up/down direction or the leftward/rightward direction. Consequently, the photographing angle is correspondingly adjusted. Due to the structural design, the access control device of the present invention not only improves the convenience of the user's application, but also improves the success rate of correct recognition.

In other words, the access control device is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An access control device with a photographing angle adjustment function, the access control device comprising:
   a main body comprising a rotating seat;
   a rotating mechanism installed on the rotating seat, wherein the rotating mechanism comprises a first rotating shaft and a second rotating shaft, and the rotating mechanism is pivotally coupled to the main body through the second rotating shaft;
   a knob element, and the knob element is located beside a side of the rotating mechanism and coaxially installed on the first rotating shaft, wherein when the knob element is operated by a user, the first rotating shaft is permitted to be manually rotated;
   a camera module disposed within the rotating mechanism and fixed on the first rotating shaft, wherein the camera module has a photographing function;
   a first driving motor disposed within the main body and drivingly coupled to the first rotating shaft, wherein the first driving motor drives rotation of the first rotating shaft, so that a photographing angle of the camera module is adjusted in a first angular range; and
   a second driving motor disposed within the main body and drivingly coupled to the second rotating shaft, wherein the second driving motor drives rotation of the second rotating shaft, so that the photographing angle of the camera module is adjusted in a second angular range.

2. The access control device according to claim 1, wherein the access control device further comprises a first transmission assembly, and the first driving motor and the first transmission assembly cooperate with each other to drive the first rotating shaft, wherein the first transmission assembly comprises at least one gear unit and a belt, and the belt is sheathed around the first rotating shaft, wherein when the at least one gear unit is driven by the first driving motor, the belt is correspondingly rolled, so that the first rotating shaft is driven to rotate.

3. The access control device according to claim 2, wherein the belt is made of elastic or deformable material.

4. The access control device according to claim 2, wherein the main body has a first opening, and the rotating mechanism has a second opening, wherein the first opening and the second opening are aligned with each other, and the belt is penetrated through the first opening and the second opening and sheathed around the first rotating shaft.

5. The access control device according to claim 2, wherein the access control device further comprises a second transmission assembly, and the second driving motor and the second transmission assembly cooperate with each other to drive the second rotating shaft, wherein the second transmission assembly comprises at least one gear unit and a gear structure, and the gear structure is coaxially installed on the second rotating shaft, wherein when the at least one gear unit is driven by the second driving motor, the gear structure is correspondingly rotated, so that the second rotating shaft is driven to rotate.

6. The access control device according to claim 1, further comprising:
   an operation interface installed on the main body;
   a control module disposed within the main body and electrically connected with the operation interface, the first driving motor and the second driving motor; and
   a wiring unit, wherein a first terminal of the wiring unit is electrically connected to the control module, and a second terminal of the wiring unit is penetrated through a hollow portion of the second rotating shaft and electrically connected with the camera module,
   wherein when the control module receives an instruction from the operation interface, the control module controls operations of the first driving motor and the second driving motor according to the instruction, wherein the control module controls operations of the camera module and receives a photographing result of the camera module through the wiring unit.

7. The access control device according to claim 6, wherein the control module comprises a firmware component or a flash memory storing an operation program code, and firmware component or the operation program code is provided to execute an automatic facial recognition program, wherein when the automatic facial recognition program is executed, the first driving motor, the second driving motor and the camera module are controlled automatically.

8. The access control device according to claim 6, wherein the wiring unit is a flexible printed circuit, and a scope of the first angular range corresponds to a length of the wiring unit.

9. The access control device according to claim 1, wherein the access control device further comprises a stepped elastic piece, and the stepped elastic piece is installed on an end of the first rotating shaft away from the knob element, wherein while the first rotating shaft is rotated, the stepped elastic piece provides multi-stage engagement, so that a stepped feel is provided to the user.

10. The access control device according to claim 1, wherein the main body comprises a base plate and a housing, wherein the housing is installed on the base plate, and the rotating seat is an accommodation space that is defined by an outer portion of the housing and a front surface of the base plate collaboratively.

11. The access control device according to claim 10, wherein a scope of the second angular range corresponds to a distance between the base plate and the rotating mechanism.

12. The access control device according to claim 1, wherein the camera module comprises at least one photographic lens, and the at least one photographic lens includes a wide-angle lens.

13. The access control device according to claim 1, wherein the first rotating shaft and the second rotating shaft are perpendicular to each other.

14. The access control device according to claim 1, wherein the first rotating shaft is arranged in a horizontal direction, so that the photographing angle of the camera module is adjusted up or down in the first angular range, wherein the second rotating shaft is arranged in a vertical direction, so that the photographing angle of the camera module is adjusted leftward or rightward in the second angular range.

15. An access control device with a photographing angle adjustment function, the access control device comprising:
   a main body comprising a rotating seat;
   a rotating mechanism installed on the rotating seat, wherein the rotating mechanism comprises a first rotating shaft and a second rotating shaft, and the rotating mechanism is pivotally coupled to the main body through the second rotating shaft;
   a camera module disposed within the rotating mechanism and fixed on the first rotating shaft, wherein the camera module has a photographing function;
   a first driving motor disposed within the main body and drivingly coupled to the first rotating shaft, wherein the first driving motor drives rotation of the first rotating shaft, so that a photographing angle of the camera module is adjusted in a first angular range; and a second driving motor disposed within the main body and drivingly coupled to the second rotating shaft, wherein the second driving motor drives rotation of the second rotating shaft, so that the photographing angle of the camera module is adjusted in a second angular range;

an operation interface installed on the main body;

a control module disposed within the main body and electrically connected with the operation interface, the first driving motor and the second driving motor; and a wiring unit, wherein a first terminal of the wiring unit is electrically connected to the control module, and a second terminal of the wiring unit is penetrated through a hollow portion of the second rotating shaft and electrically connected with the camera module, wherein when the control module receives an instruction from the operation interface, the control module controls operations of the first driving motor and the second driving motor according to the instruction, wherein the control module controls operations of the camera module and receives a photographing result of the camera module through the wiring unit.

16. The access control device according to claim 15, wherein the control module comprises a firmware component or a flash memory storing an operation program code, and firmware component or the operation program code is provided to execute an automatic facial recognition program, wherein when the automatic facial recognition program is executed, the first driving motor, the second driving motor and the camera module are controlled automatically.

* * * * *